(12) United States Patent
Francis et al.

(10) Patent No.: US 11,939,922 B2
(45) Date of Patent: Mar. 26, 2024

(54) FUEL ASSEMBLY FOR A GAS TURBINE ENGINE

(71) Applicant: Pratt & Whitney Canada Corp., Longueuil (CA)

(72) Inventors: Roger N. A. Francis, Toronto (CA); Jeevan Sian, Georgetown (CA); Bryan Bond, Adjala-Tosorontio (CA); Michael Fryer, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/891,756

(22) Filed: Aug. 19, 2022

(65) Prior Publication Data
US 2024/0060450 A1    Feb. 22, 2024

(51) Int. Cl.
| | |
|---|---|
| F02C 7/00 | (2006.01) |
| F01D 25/24 | (2006.01) |
| F02C 7/06 | (2006.01) |
| F02C 7/22 | (2006.01) |
| F02C 7/232 | (2006.01) |

(52) U.S. Cl.
CPC ............ *F02C 7/222* (2013.01); *F01D 25/243* (2013.01); *F02C 7/06* (2013.01); *F02C 7/232* (2013.01); *F05D 2250/38* (2013.01); *F05D 2260/31* (2013.01); *F05D 2260/60* (2013.01)

(58) Field of Classification Search
None
See application file for complete search history.

(56) References Cited

U.S. PATENT DOCUMENTS

| | | | | |
|---|---|---|---|---|
| 3,775,975 | A | * 12/1973 | Stenger | .................... F02C 7/232 |
| | | | | 60/798 |
| 3,793,838 | A | 2/1974 | Nash | |
| 3,879,940 | A | 4/1975 | Stenger | |
| 4,592,200 | A | * 6/1986 | Benoist | ...................... F23R 3/20 |
| | | | | 60/749 |
| 7,757,494 | B2 | 7/2010 | Duverneuil | |
| 10,240,534 | B2 | 3/2019 | Sheil | |
| 2015/0176496 | A1* | 6/2015 | Zordan | .................... F02C 7/228 |
| | | | | 137/561 A |
| 2015/0361897 | A1 | 12/2015 | Steele | |
| 2016/0245182 | A1* | 8/2016 | Elwasila | ................. F02C 7/228 |
| 2016/0258360 | A1* | 9/2016 | Sheil | ....................... F16C 35/06 |

FOREIGN PATENT DOCUMENTS

CN           114876646 B      9/2022

OTHER PUBLICATIONS

EP Search Report for EP Patent Application 23192236.0 dated Jan. 3, 2024.

* cited by examiner

*Primary Examiner* — Edwin Kang
(74) *Attorney, Agent, or Firm* — Getz Balich LLC (57) ABSTRACT

A fuel assembly for a gas turbine engine includes a fuel supply tube, a fuel port, a fuel manifold, and a fuel manifold adapter. The fuel supply tube is configured to convey a fuel. The fuel port is fluidly coupled to the fuel supply tube and configured to receive the fuel from the fuel supply tube. The fuel manifold includes a fuel inlet and a plurality of fuel outlets. The fuel inlet is fluidly coupled to the fuel port and configured to receive the fuel from the fuel port. The fuel manifold adapter includes a first mount portion and a second mount portion. The first mount portion is connected to the fuel port. The first mount portion is moveable relative to the second mount portion.

9 Claims, 9 Drawing Sheets

FUEL ASSEMBLY FOR A GAS TURBINE ENGINE

TECHNICAL FIELD

This disclosure relates generally to fuel assemblies for gas turbine engines, more particularly, to fuel manifold adapters for mounting a fuel assembly.

BACKGROUND OF THE ART

A gas turbine engine may include a fuel assembly which, for example, may convey and inject a fuel into a combustor of the gas turbine engine. Various configurations of fuel assemblies are known in the art for gas turbine engines. While these known configurations have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a fuel assembly for a gas turbine engine includes a fuel supply tube, a fuel port, a fuel manifold, and a fuel manifold adapter. The fuel supply tube is configured to convey a fuel. The fuel port is fluidly coupled to the fuel supply tube and configured to receive the fuel from the fuel supply tube. The fuel manifold includes a fuel inlet and a plurality of fuel outlets. The fuel inlet is fluidly coupled to the fuel port and configured to receive the fuel from the fuel port. The fuel manifold adapter includes a first mount portion and a second mount portion. The first mount portion is connected to the fuel port. The first mount portion is moveable relative to the second mount portion.

In any of the aspects or embodiments described above and herein, the fuel port may be fluidly coupled to the fuel inlet by one or more fuel conduits. The fuel assembly may further include a fuel sleeve. The fuel sleeve may include a first end and a second end opposite the first end. The first end may be located at the fuel port. The second end may be located at the fuel inlet. The fuel sleeve may surround the one or more fuel conduits from the first end to the second end.

In any of the aspects or embodiments described above and herein, the first mount portion may include a first fastener, the second mount portion may include a second fastener, and the fuel manifold adapter may further include a link including a link body. The link body may be rotatably mounted to each of the first fastener and the second fastener.

In any of the aspects or embodiments described above and herein, the link may include a first bearing and a second bearing. Each of the first bearing and the second bearing may be mounted within the link body. The first bearing may surround the first fastener and the second bearing may surround the second fastener.

In any of the aspects or embodiments described above and herein, one or both of the first bearing and the second bearing may be configured as a spherical bearing.

In any of the aspects or embodiments described above and herein, the second mount portion may include a tubular body and the first mount portion may be configured to slide within the tubular body.

In any of the aspects or embodiments described above and herein, the first mount portion may include one or more O-rings in contact with the tubular body.

In any of the aspects or embodiments described above and herein, the first mount portion may include a spherical bearing and the spherical bearing may be rotatably mounted within the second mount portion.

In any of the aspects or embodiments described above and herein, the fuel port may be located between the fuel manifold adapter and the fuel manifold.

In any of the aspects or embodiments described above and herein, the fuel assembly may further include a flow divider valve. The flow divider valve may be fluidly coupled to the fuel supply tube and configured to supply the fuel to the fuel supply tube.

According to another aspect of the present disclosure, a fuel assembly for a gas turbine engine includes a first case, a second case, a flow divider valve, a fuel supply tube, and a fuel manifold adapter. The first case extends circumferentially about an axial centerline. The first case extends from a first axial end of the first case to a second axial end of the first case. The second case extends circumferentially about the axial centerline. The second case extends from a first axial end of the second case to a second axial end of the second case. The first axial end of the second case is mounted to the second axial end of the first case. The flow divider valve is mounted to the first case. The fuel supply tube is connected to the flow divider valve. The fuel manifold adapter is mounted to the second case. The fuel manifold adapter includes a first mount portion and a second mount portion. The first mount portion is connected to the fuel supply tube. The second mount portion is connected to the second case. The first mount portion is axially moveable relative to the second mount portion.

In any of the aspects or embodiments described above and herein, the second case may include a flange at the second axial end of the second case, the second mount portion mounted to the flange.

In any of the aspects or embodiments described above and herein, the fuel assembly may further include a fuel manifold extending circumferentially about the axial centerline. The fuel manifold may be mounted to the second case. The fuel manifold may be connected to the first mount portion.

In any of the aspects or embodiments described above and herein, the fuel manifold may be located axially between the fuel manifold adapter and the flow divider valve.

In any of the aspects or embodiments described above and herein, the fuel manifold may be connected to the first mount portion by a fuel port and the fuel port may be fluidly coupled with the fuel supply tube.

According to another aspect of the present disclosure, a gas turbine engine having an axial centerline includes a combustor, a bladed turbine rotor, a first case, a second case, a flow divider valve, a fuel supply tube, and a fuel manifold adapter. The bladed turbine rotor configured to rotate in response to a combustion gas flow from the combustor. The first case extends circumferentially about the axial centerline. The first case surrounds at least a portion of the combustor. The second case extends circumferentially about the axial centerline. The second case is positioned axially adjacent the first case. The second case surrounds at least a portion of the bladed turbine rotor. The flow divider valve is mounted to the first case. The fuel supply tube is connected to the flow divider valve. The fuel manifold adapter is mounted to the second case. The fuel manifold adapter includes a first mount portion and a second mount portion. The first mount portion is connected to the fuel supply tube.

The second mount portion is connected to the second case. The first mount portion is moveable relative to the second mount portion.

In any of the aspects or embodiments described above and herein, the first mount portion may include a first fastener, the second mount portion may include a second fastener, and the fuel manifold adapter may further include a link including a link body. The link body may be rotatably mounted to each of the first fastener and the second fastener.

In any of the aspects or embodiments described above and herein, the link may extend along a link center axis and the link center axis may be offset from a radial direction by an offset angle in an axial direction toward the flow divider valve.

In any of the aspects or embodiments described above and herein, the offset angle may have a nominal value of between one degree (1°) and ten degrees (10°).

In any of the aspects or embodiments described above and herein, the gas turbine engine may further include a fuel manifold extending circumferentially about the axial centerline. The fuel manifold may be mounted to the second case. The fuel manifold may be connected to the first mount portion. The fuel manifold may be located axially between the fuel manifold adapter and the flow divider valve.

The present disclosure, and all its aspects, embodiments and advantages associated therewith will become more readily apparent in view of the detailed description provided below, including the accompanying drawings.

DETAILED DESCRIPTION

Figure 1:
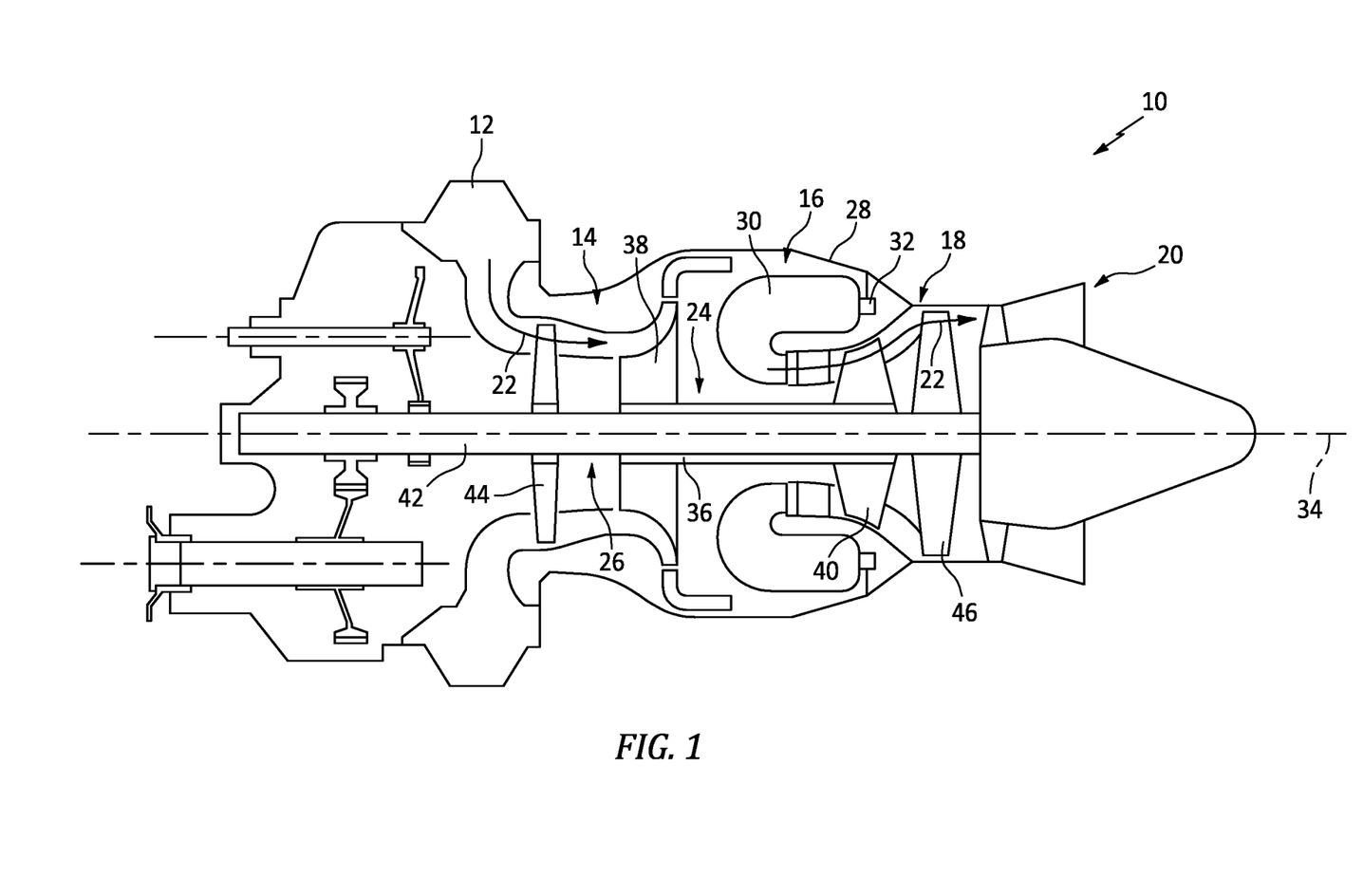
FIG. 1 illustrates a schematic view of a gas turbine engine, in accordance with one or more embodiments of the present disclosure.

FIG. 1 schematically illustrates a gas turbine engine 10. The gas turbine engine 10 of FIG. 1 is a multi-spool turboshaft gas turbine engine for an aircraft propulsion system. However, while the following description and accompanying drawings may refer to the turboshaft gas turbine engine of FIG. 1 as an example, it should be understood that aspects of the present disclosure may be equally applicable to other types of gas turbine engines including, but not limited to, a turboprop gas turbine engine, a turbofan gas turbine engine, a turbojet gas turbine engine, a propfan gas turbine engine, or an open rotor gas turbine engine. Moreover, aspects of the present disclosure are not limited to aircraft or aircraft propulsion systems. The gas turbine engine 10 of FIG. 1 includes an air inlet 12, a compressor section 14, a combustor section 16, a turbine section 18, and an exhaust section 20. The compressor section 14 drives air from the air inlet 12 along a core flow path 22 for compression and communication into the combustor section 16, expansion through the turbine section 18, and exhaust from the gas turbine engine 10 via the exhaust section 20.

The gas turbine engine 10 of FIG. 1 includes a first rotational assembly 24 (e.g., a high-pressure spool) and a second rotational assembly 26 (e.g., a low-pressure spool), an engine static structure 28 (e.g., a turbine case, an exhaust case, a bearing compartment case, etc.), an annular combustor 30, and a fuel assembly 32. It should be understood that "low pressure" and "high pressure" or variations thereof as used herein are relative terms indicating that the high pressure is greater than the low pressure. The first rotational assembly 24 and the second rotational assembly 26 are mounted for rotation about an axial centerline 34 (e.g., a rotational axis) of the gas turbine engine 10 relative to the engine static structure 28.

The first rotational assembly 24 includes a first shaft 36, a bladed first compressor rotor 38, and a bladed first turbine rotor 40. The first shaft 36 interconnects the bladed first compressor rotor 38 and the bladed first turbine rotor 40. The second rotational assembly 26 includes a second shaft 42, a bladed second compressor rotor 44, and a bladed second turbine rotor 46. The second shaft 42 interconnects the bladed second compressor rotor 44 and the bladed second turbine rotor 46. The second shaft 42 may additionally be connected to one or more rotational loads (e.g., a propeller), for example, directly or by one or more speed-reducing gear assemblies. The combustor 30 of FIG. 1 is disposed between the bladed first compressor rotor 38 and the bladed first turbine rotor 40 along the core flow path 22. The fuel assembly 32 is positioned at (e.g., on, adjacent, or proximate) the combustor 30. The fuel assembly 32 is configured to introduce fuel to the combustor 30 to facilitate the generation of a blended fuel-air mixture that supports combustion in the combustion combustor 30.

In operation, airflow along the core flow path 22 is compressed by the bladed first compressor rotor 38 and the bladed second compressor rotor 44, mixed and burned with fuel in the combustor 30, and then expanded across the bladed first turbine rotor 40 and the bladed second turbine rotor 46. The bladed first turbine rotor 40 and the bladed second turbine rotor 46 rotationally drive the first rotational assembly 24 and the second rotational assembly 26, respectively, in response to the expansion of the combustion gases. The first shaft 36 and the second shaft 42 are concentric and rotate about the axial centerline 34, which axial centerline 34 is collinear with respective rotational axes of the first shaft 36 and the second shaft 42.

Figure 2:
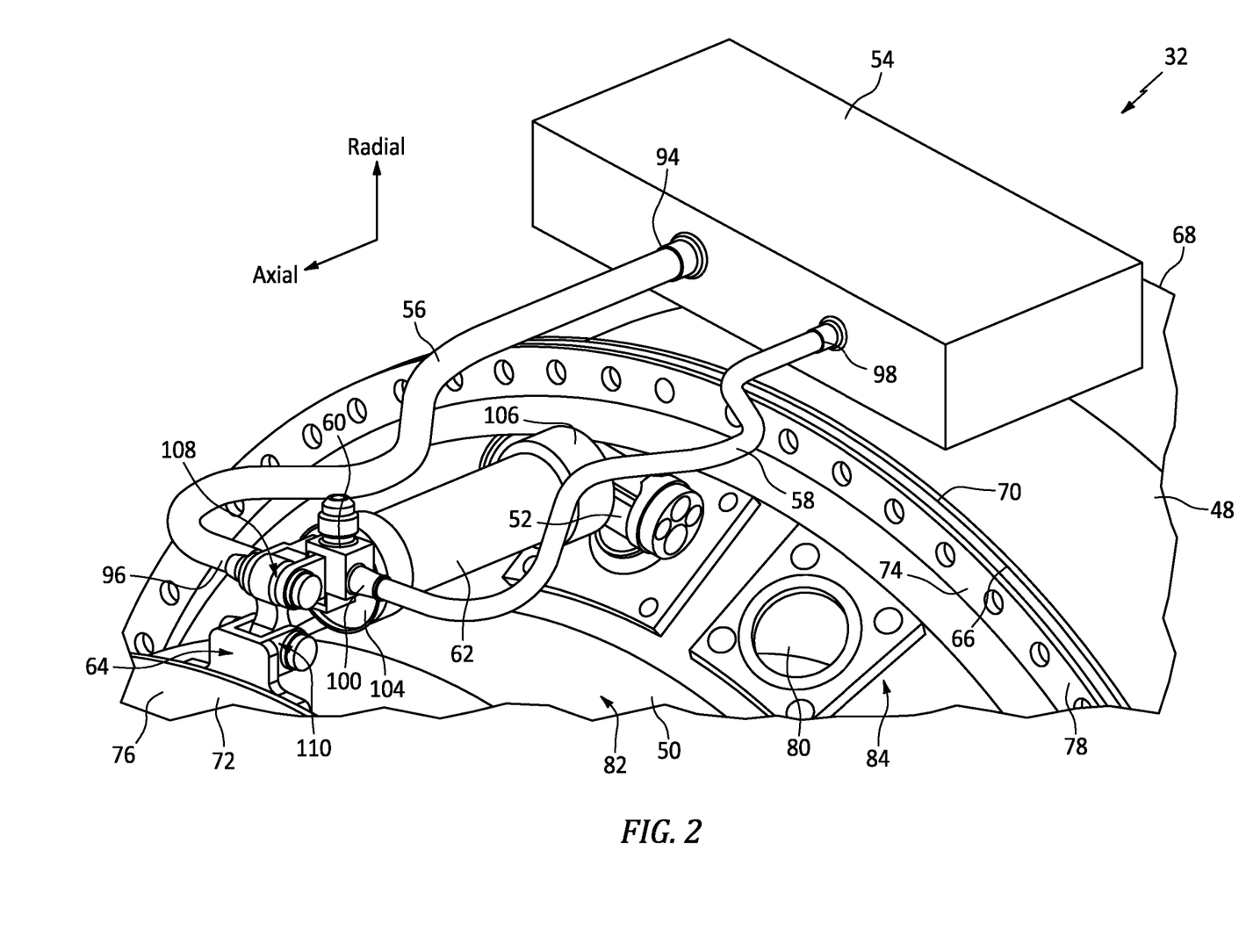
FIG. 2 illustrates a perspective view of portions of a fuel assembly for a gas turbine engine, in accordance with one or more embodiments of the present disclosure.
Figure 3:
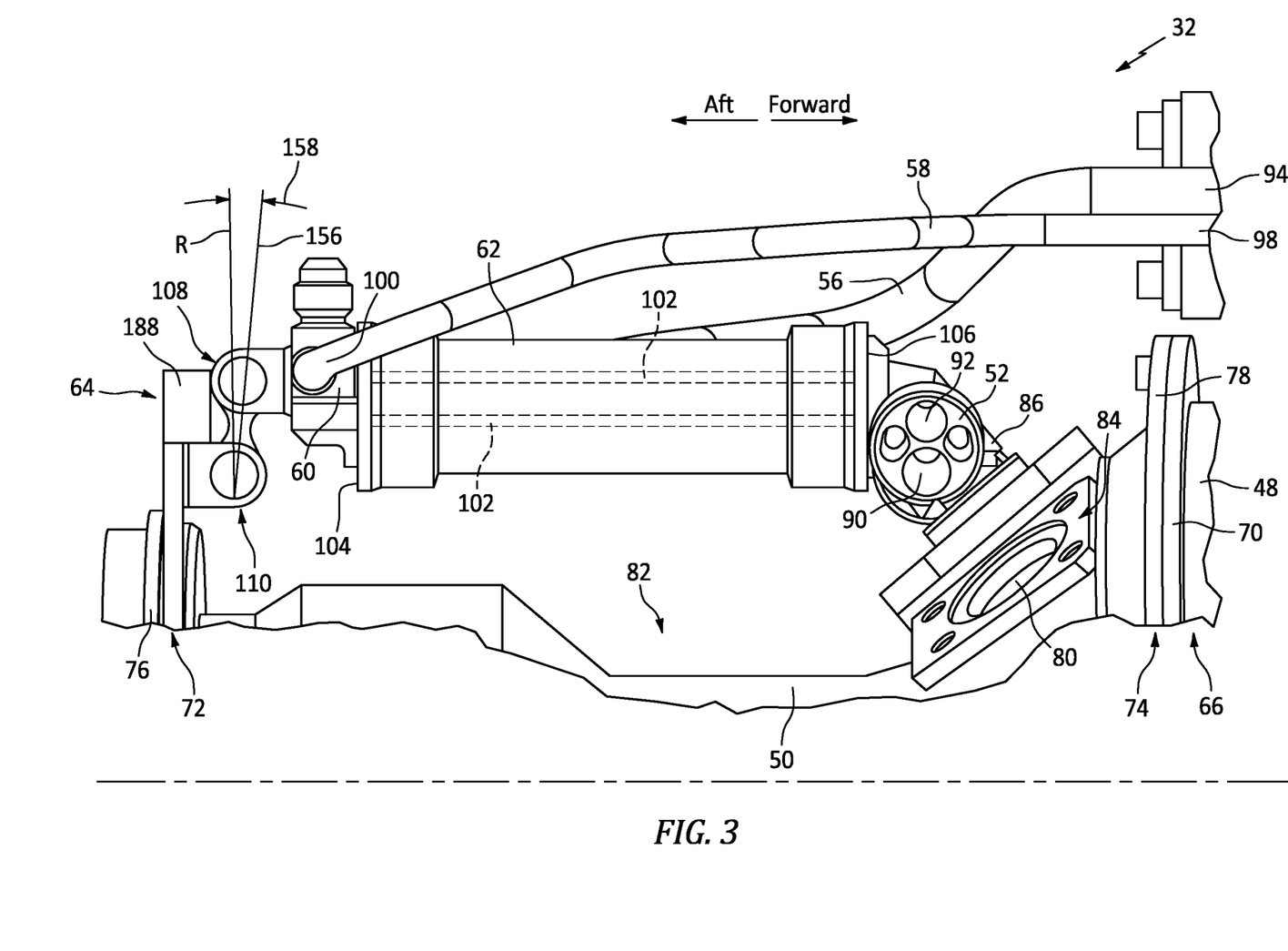
FIG. 3 illustrates a side view of portions of the fuel assembly of FIG. 2, in accordance with one or more embodiments of the present disclosure.
Figure 4:
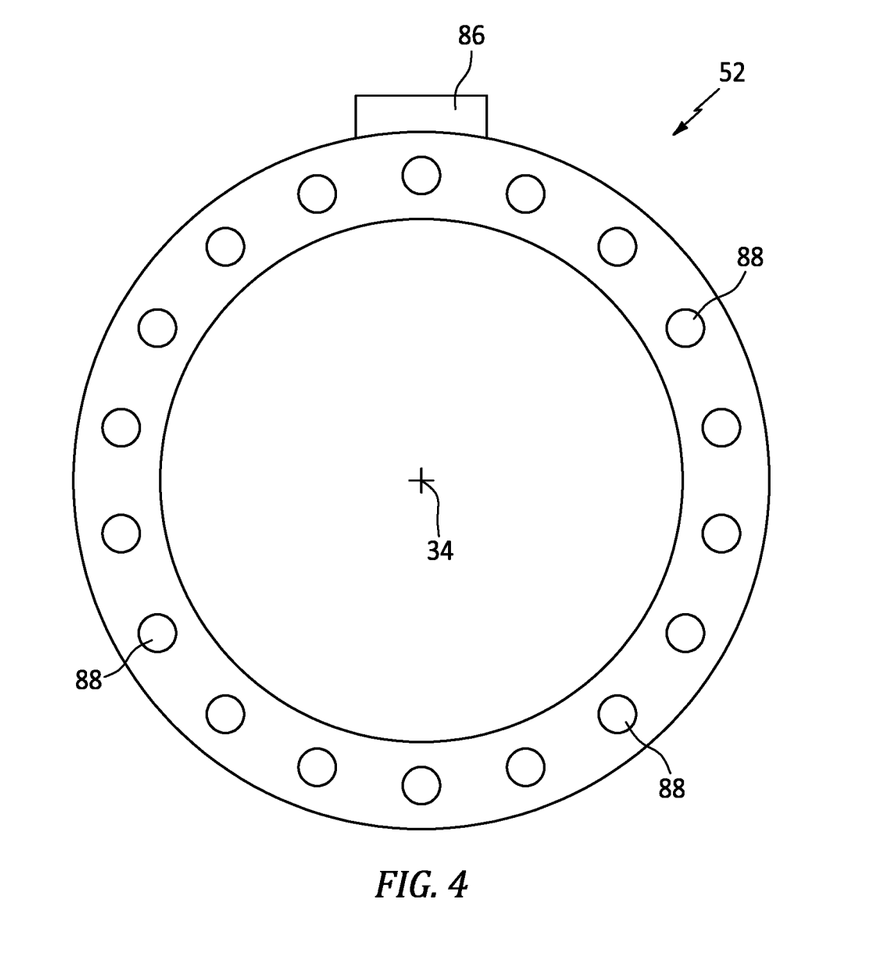
FIG. 4 illustrates a schematic view of an exemplary fuel manifold for a gas turbine engine, in accordance with one or more embodiments of the present disclosure.

FIGS. 2-4 illustrate views of portions of an embodiment of the fuel assembly 32. The fuel assembly 32 of FIGS. 2-4 includes a first case 48, a second case 50, a fuel manifold 52, a flow divider valve 54, a primary fuel supply tube 58, a secondary fuel supply tube 56, a fuel port 60, a fuel sleeve 62, and a fuel manifold adapter 64. Portions of the fuel manifold 52 have been omitted from FIGS. 2 and 3 for clarity.

The first case 48 forms a portion of the engine static structure 28 (see FIG. 1). The first case 48 extends circumferentially about (e.g., completely around) the axial centerline 34. The first case 48 may surround at least a portion of the combustor 30 (see FIG. 1). The first case 48 extends axially between and to a first axial end 66 of the first case 48 and a second axial end 68 of the first case 48. The first axial end 66 of FIGS. 2 and 3 is axially aft of the second axial end 68 of FIGS. 2 and 3. However, the present disclosure is not limited to this particular orientation of the first case 48. The first case 48 includes a flange 70 (e.g., an annular flange). The flange 70 is located at (e.g., on, adjacent, or proximate) the first axial end 66.

The second case 50 forms a portion of the engine static structure 28 (see FIG. 1). The second case 50 extends circumferentially about (e.g., completely around) the axial centerline 34. The second case 50 may surround at least a portion of the bladed first turbine rotor 40 and/or the bladed second turbine rotor 46 (see FIG. 1). The second case 50 extends axially between and to a first axial end 72 of the second case 50 and a second axial end 74 of the second case 50. The first axial end 72 of FIGS. 2 and 3 is axially aft of the second axial end 74 of FIGS. 2 and 3. However, the present disclosure is not limited to this particular orientation of the second case 50. The second case 50 includes a first flange 76 (e.g., an annular flange), a second flange 78 (e.g., an annular flange), and a plurality of fuel injector apertures 80. The first flange 76 is located at (e.g., on, adjacent, or proximate) the first axial end 72. The first flange 76 may be configured to mate with a respective flange such as, for example, a flange of a turbine exhaust case for the gas turbine engine 10 (see FIG. 1). The second flange 78 is located at (e.g., on, adjacent, or proximate) the second axial end 74. The second flange 78 is configured to be fixedly mounted to the flange 70, for example, using a plurality of fasteners which extend through the flange 70 and the second flange 78. The plurality of fuel injector apertures 80 are formed by the second case 50. The plurality of fuel injector apertures 80 are circumferentially distributed about (e.g., completely around) the second case 50. The plurality of fuel injector apertures 80 are each configured to accommodate a respective fuel injector (not shown), fuel nozzle, or other fuel assembly component(s) of the fuel assembly 32, which respective fuel assembly component is in fluid communication with the combustion chamber of the combustor 30 and configured to inject fuel into the combustor 30.

The second case 50 may include a first axial portion 82 and a second axial portion 84 as shown, for example, in FIGS. 2 and 3. The first axial portion 82 extends axially between and to the first axial end 72 and the second axial portion 84. The second axial portion 84 extends axially between and to the first axial portion 82 and the second axial end 74. The first axial portion 82 may have a substantially cylindrical shape. The second axial portion 84 may extend radially outward and axially forward in a direction from the first axial portion 82 to the second axial end 74. The plurality of fuel injector apertures 80 may be located in the second axial portion 84.

FIG. 4 illustrates a schematic view of the fuel manifold 52. The fuel manifold 52 extends circumferentially about (e.g., completely around) the axial centerline 34. The fuel manifold 52 of FIGS. 2 and 3 is mounted to the second case 50 (e.g., a radial exterior of the second case 50). The fuel manifold 52 includes a fuel inlet 86 and a plurality of fuel outlets 88. The fuel manifold 52 may be configured to receive fuel from one or more fuel sources (not shown) via the fuel inlet 86. The fuel manifold 52 may be configured to provide the fuel to a plurality of fuel injectors, fuel nozzles, or other fuel assembly component(s) (not shown), which fuel assembly component is fluidly coupled to respective fuel outlets 88. The fuel manifold 52 of FIG. 4 is provided herein to facilitate the description of the fuel assembly 32, and it should be understood that the fuel assembly 32 of the present disclosure is not limited to the particular fuel manifold 52 illustrated in FIG. 4.

The fuel manifold 52 of FIGS. 2 and 3 includes a primary fuel circuit and a secondary fuel circuit. The present disclosure, however, is not limited to fuel assemblies or fuel manifolds including two fuel circuits (e.g., a primary circuit and a secondary circuit). A primary fuel flow of the primary fuel circuit may flow through the fuel manifold 52 by way of one or more primary fuel tubes or other fluid conduits such as, for example, primary fuel conduit 90. Similarly, a secondary fuel flow of the secondary fuel circuit may flow through the fuel manifold 52 by way of one or more secondary fuel tubes or other fluid conduits such as, for example, secondary fuel conduit 92.

The flow divider valve 54 of FIGS. 2 and 3 is mounted to the first case 48 (e.g., a radial exterior of the first case 48). The flow divider valve 54 of FIGS. 2 and 3 is located axially forward of the fuel manifold 52. The flow divider valve 54 is configured to divide a fuel flow (e.g., a single fuel stream) from a fuel source (not shown) into a plurality of separate fuel flows (e.g., separate fuel streams), for example, a primary fuel flow for the primary fuel circuit of the fuel manifold 52 and a secondary fuel flow for the secondary fuel circuit of the fuel manifold 52.

The primary fuel supply tube 58 of FIGS. 2 and 3 is configured to convey the primary fuel flow from the flow divider valve 54. The primary fuel supply tube 58 may be configured as a substantially rigid tube. The primary fuel supply tube 58 extends between and to a first end 98 of the primary fuel supply tube 58 and a second end 100 of the primary fuel supply tube 58. The first end 98 is fluidly coupled to the flow divider valve 54. The primary fuel supply tube 58 may include one or more bends or other curvatures to accommodate expansion and/or contraction (e.g., thermal expansion or contraction) of one or more components of the fuel assembly 32.

The secondary fuel supply tube 56 of FIGS. 2 and 3 is configured to convey the secondary fuel flow from the flow divider valve 54. The secondary fuel supply tube 56 may be configured as a substantially rigid tube. The secondary fuel supply tube 56 extends between and to a first end 94 of the secondary fuel supply tube 56 and a second end 96 of the secondary fuel supply tube 56. The first end 94 is fluidly coupled to the flow divider valve 54. The secondary fuel supply tube 56 may include one or more bends or other curvatures to accommodate expansion and/or contraction (e.g., thermal expansion or contraction) of one or more components of the fuel assembly 32.

The fuel port 60 of FIGS. 2 and 3 is configured to receive the primary fuel flow from the primary fuel supply tube 58. The fuel port 60 is fluidly coupled to the second end 100. The fuel port 60 of FIGS. 2 and 3 is configured to receive the secondary fuel flow from the secondary fuel supply tube 56. The fuel port 60 is fluidly coupled to the second end 96. The fuel port 60 is configured to convey the primary fuel flow and the secondary fuel flow to the fuel manifold 52. The fuel port 60 may convey the primary fuel flow and the secondary fuel flow to the fuel manifold 52 by way of one or more fuel conduits 102 extending between and fluidly coupling the fuel port 60 and the fuel inlet 86. The fuel conduits 102 may be configured as substantially straight conduits. The fuel port 60 of FIGS. 2 and 3 is located axially aft of the fuel manifold 52.

The fuel sleeve 62 of FIGS. 2 and 3 extends between and to a first axial end 104 of the fuel sleeve 62 and a second axial end 106 of the fuel sleeve 62. The first axial end 104 is located at (e.g., on, adjacent, or proximate) or otherwise mounted to the fuel port 60. The second axial end 106 is located at (e.g., on, adjacent, or proximate) or otherwise mounted to the fuel manifold 52. The fuel sleeve 62 may extend in a substantially axial direction from the first axial end 104 to the second axial end 106. The fuel sleeve 62 may be configured as a cylindrical body. The fuel sleeve 62 may be disposed circumferentially about (e.g., completely around the fuel conduits 102. The fuel sleeve 62 may provide fire protection, fuel leak protection, and/or fuel leak indication for the fuel conduits 102.

The fuel manifold adapter 64 includes a first mount portion 108 and a second mount portion 110 movably connected to the first mount portion 108. For example, the first mount portion 108 is moveable relative to the second mount portion 110. The first mount portion 108 is connected to the fuel port 60, which fuel port 60 may form a portion of the fuel manifold adapter 64, for example, the first mount portion 108. For example, the fuel port 60 may be integrally formed with the first mount portion 108. The second mount portion 110 is connected to the second case 50 at (e.g., on, adjacent, or proximate) the first flange 76. The first mount portion 108 of FIGS. 2 and 3 is located radially outward from the second mount portion 110.

Figure 5:
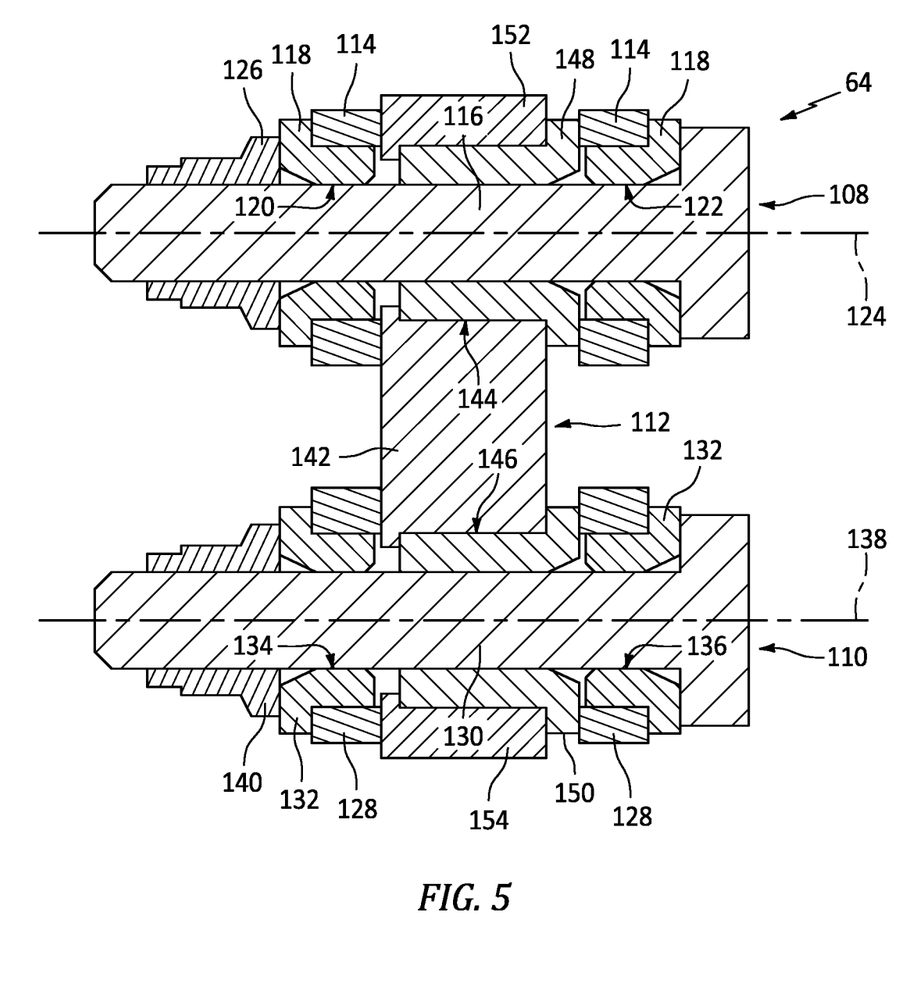
FIG. 5 illustrates a cutaway view of a fuel manifold adapter for the fuel assembly of FIGS. 2 and 3, in accordance with one or more embodiments of the present disclosure.

FIG. 5 illustrates a sectional view of the fuel manifold adapter 64 of FIGS. 2 and 3. The fuel manifold adapter 64 of FIGS. 2, 3, and 5 includes the first mount portion 108, the second mount portion 110, and a link 112. The link 112 is rotatably connected to the first mount portion 108 and the second mount portion 110.

The first mount portion 108 of FIG. 5 includes a bracket 114, a fastener 116, and outer bearings 118. The bracket 114 may be formed by or otherwise mounted to the fuel port 60. The bracket 114 forms a first aperture 120 and a second aperture 122. The first aperture 120 and the second aperture 122 are coaxial with respect to a rotational axis 124 (e.g., the first aperture 120 and the second aperture 122 share a common center axis). One of the outer bearings 118 is located in each of the first aperture 120 and the second aperture 122. The fastener 116 extends through each of the outer bearings 118 along the rotational axis 124. The fastener 116 may be configured as a bolt, a pin, or any other cylindrical body configured to extend through and contact the outer bearings 118 along the rotational axis 124. The fastener 116 may include a retention member 126 such as a threaded nut, a pin, or the like. The outer bearings 118 of FIG. 5 may be configured, for example, as bushings or any other suitable bearing configuration.

The second mount portion 110 of FIG. 5 includes a bracket 128, a fastener 130, and outer bearings 132. The bracket 128 may be formed by or otherwise mounted to the second case 50, for example, at (e.g., on, adjacent, or proximate) the first flange 76. The bracket 128 forms a first aperture 134 and a second aperture 136. The first aperture 134 and the second aperture 136 are coaxial with respect to a rotational axis 138 (e.g., the first aperture 134 and the second aperture 136 share a common center axis). One of the outer bearings 132 is located in each of the first aperture 134 and the second aperture 136. The fastener 130 extends through each of the outer bearings 132 along the rotational axis 138. The fastener 130 may be configured as a bolt, a pin, or any other cylindrical body configured to extend through and contact the outer bearings 132 along the rotational axis 138. The fastener 130 may include a retention member 140 such as a threaded nut, a pin, or the like. The outer bearings 132 of FIG. 5 may be configured, for example, as bushings or any other suitable bearing configuration.

The link 112 of FIG. 5 includes a link body 142, a first aperture 144, a second aperture 146, a first bearing 148, and a second bearing 150. The link body 142 extends longitudinally between and to a first end 152 of the link 112 and a second end 154 of the link 112. The first aperture 144 is formed by the link body 142 at (e.g., on, adjacent, or proximate) the first end 152. The second aperture 146 is formed by the link body 142 at (e.g., on, adjacent, or proximate) the second end 154. The first bearing 148 is mounted to the link body 142 within the first aperture 144. The first bearing 148 surrounds and rotatably contacts the fastener 116, such that the link 112 is configured to rotate about the fastener 116 and, thus, the rotational axis 124. The first bearing 148 is positioned axially between the outer bearings 118 with respect to the rotational axis 124. The second bearing 150 is mounted to the link body 142 within the second aperture 146. The second bearing 150 surrounds and rotatably contacts the fastener 130, such that the link 112 is configured to rotate about the fastener 130 and, thus, the rotational axis 138. The second bearing 150 is positioned axially between the outer bearings 132 with respect to the rotational axis 138. The first bearing 148 and the second bearing 150 of FIG. 5 may be configured, for example, as bushings or any other suitable bearing configuration.

During operation of the gas turbine engine 10 (see FIG. 1), the first case 48, second case 50, and/or other components of the fuel assembly 32 may be exposed to different amounts of thermal energy and may, therefore, experience different degrees of thermal expansion and contraction. For example, the second case 50 may be significantly hotter in proximity to the second flange 78 than the first case 48 and the second case 50 in proximity to the respective flange 70 and first flange 76. The fuel manifold adapter 64 may facilitate improved resistance of the components of the fuel assembly 32 (e.g., the primary fuel supply tube 58 and/or the secondary fuel supply tube 56) to strain and/or degradation which may be caused by thermal expansion and contraction. The fuel manifold adapter 64 of FIGS. 2, 3, and 5 accommodates movement of the components of the fuel assembly 32 in the axial direction. The substantially radial orientation of the link 112 facilitates reduced radial deflection of the components of the fuel assembly 32 in response to relatively larger axial deflections. The fuel manifold adapter 64 may also limit tangential deflections of the components of the fuel assembly 32. The fuel manifold adapter 64 may ensure that deformation of the primary fuel supply tube 58 and/or the secondary fuel supply tube 56 (e.g., rigid tubes) during operation of the gas turbine engine 10 is within the strain limitations of the primary fuel supply tube 58 and/or the secondary fuel supply tube 56.

Referring to FIG. 3, the link 112 extends along a link center axis 156, which link center axis 156 extends between the first end 152 and the second end 154. In some embodiments, the fuel manifold adapter 64 may be configured with the link center axis 156 offset from a radial direction R with respect to the axial centerline 34. The link center axis 156 may be offset from the radial direction R by an offset angle 158 in an axial direction toward the flow divider valve 54 (e.g., an axially forward direction). The offset angle 158 may be selected to accommodate an expected range of axial growth of the components of the fuel assembly 32 during operation of the gas turbine engine 10 (see FIG. 1). In some embodiments, the offset angle 158 may have a nominal value of greater than zero degrees (0°). In some embodiments, the offset angle 158 may have a nominal value which is greater than zero degrees (0°) and less than or equal to thirty-five degrees (35°). In some embodiments, the offset angle 158 may have a nominal value of greater than zero degrees (0°) and less than or equal to ten degrees (10°). In some embodiments, the offset angle may have a nominal value of approximately five degrees (5°). As used herein, the term "nominal value" refers to the angle value of the offset angle 158 with the gas turbine engine 10 in a cooled condition (e.g., a non-operational condition of the gas turbine engine 10 with the gas turbine engine 10 cooled to approximately the ambient temperature). As used herein, the term "approximately" refers to the stated value +/- ten percent (10%). In some embodiments, the fuel manifold adapter 64 may include a stop 188 (e.g., a rotational stop) configured to prevent or otherwise limit rotation of the link 112 in an axial direction away from the flow divider valve 54 (e.g., in an axially aft direction). The stop 188 may be formed, for example, by a portion of the second mount portion 110 and may extend in a radially outward direction to obstruct rotation of the link 112.

Figure 6:
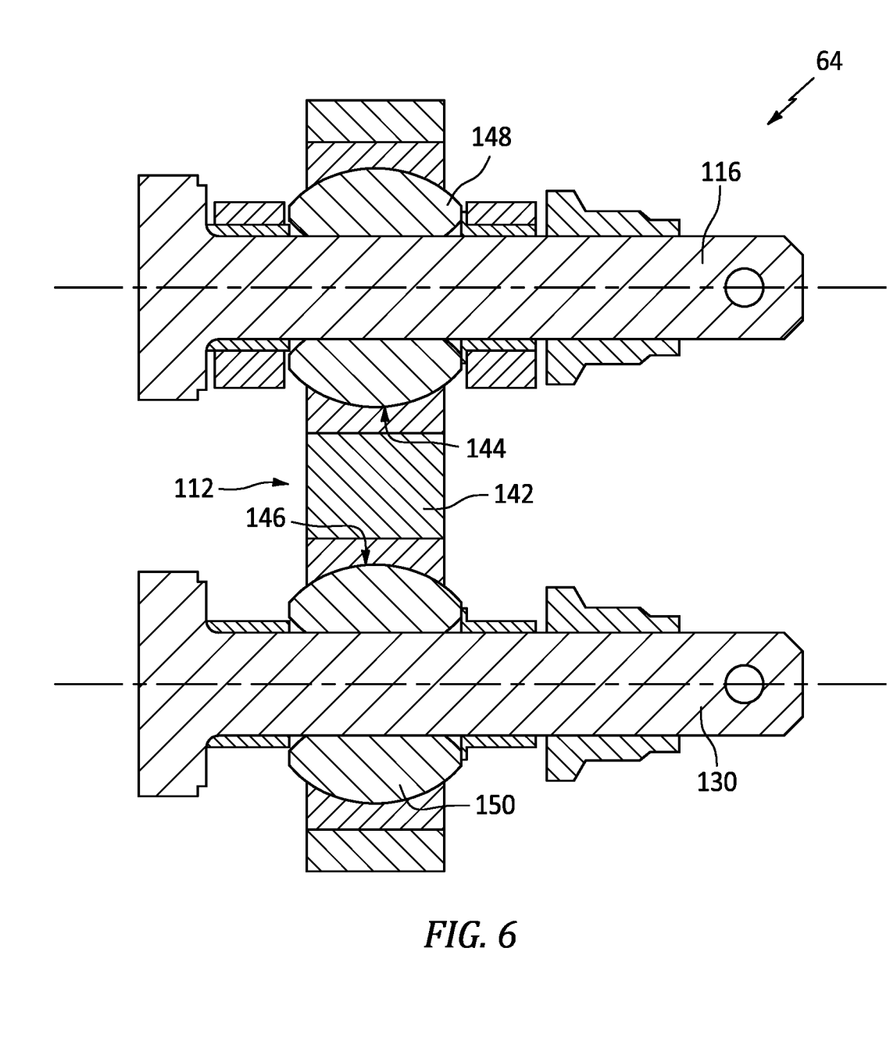
FIG. 6 illustrates a cutaway view of another fuel manifold adapter, in accordance with one or more embodiments of the present disclosure.

Referring to FIG. 6, in some embodiments of the fuel manifold adapter 64, one or both of the first bearing 148 and the second bearing 150 may be configured as spherical bearings. For example, the link 112 of FIG. 6 includes the first spherical bearing 148 mounted to the link body 142 within the first aperture 144 and the second spherical bearing 150 mounted to the link body 142 within the second aperture 146. The first spherical bearing 148 surrounds and rotatably contacts the fastener 116, such that the link 112 is configured to rotate about the fastener 116 and, thus, the rotational axis 124 (see FIG. 5). The second spherical bearing 150 surrounds and rotatably contacts the fastener 130, such that the link 112 is configured to rotate about the fastener 130 and, thus, the rotational axis 138 (see FIG. 5). The fuel manifold adapter 64 of FIG. 6 may permit greater movement (e.g., greater tangential movement) of the components of the fuel assembly 32 (see FIGS. 2 and 3), for example, relative to the fuel manifold adapter 64 of FIG. 5.

Figure 7:
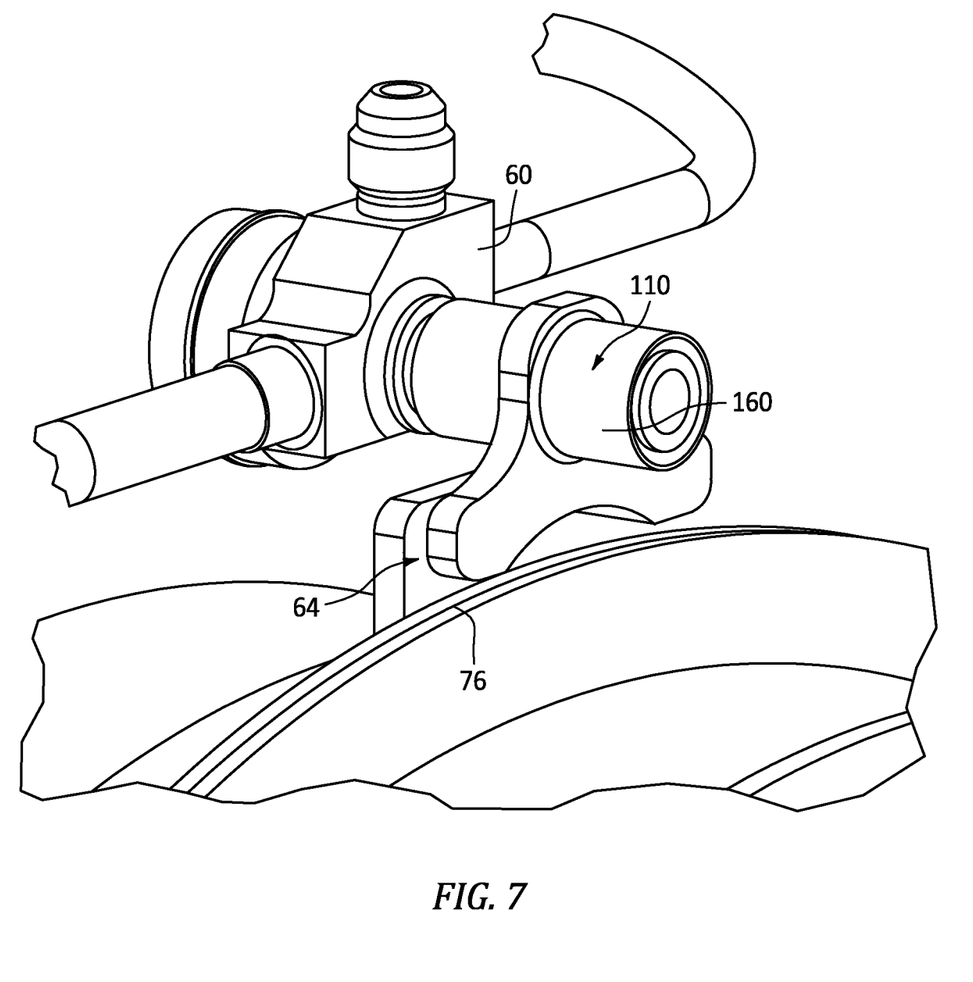
FIG. 7 illustrates a perspective view of portions of a fuel assembly for a gas turbine engine, in accordance with one or more embodiments of the present disclosure.
Figure 8:
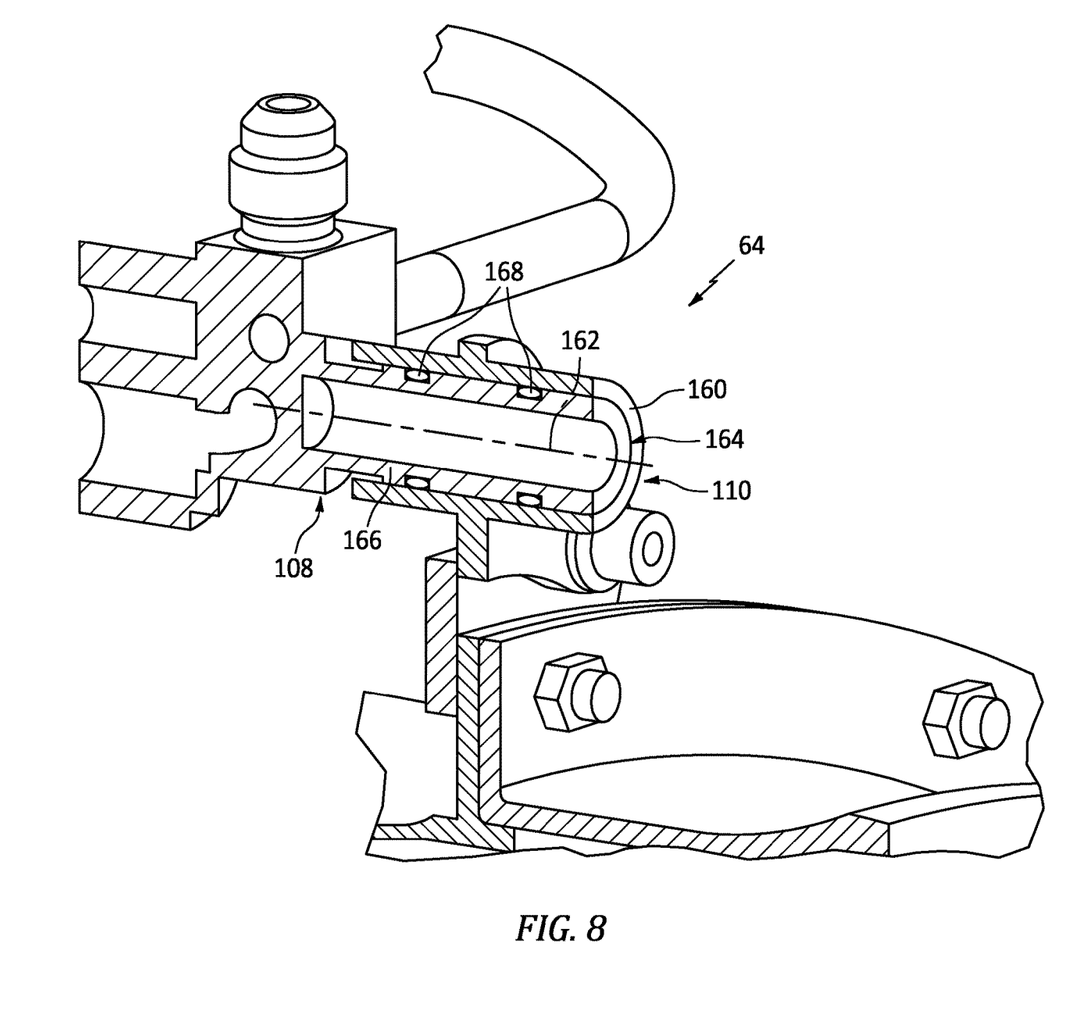
FIG. 8 illustrates a cutaway view of another fuel manifold adapter for the fuel assembly of FIG. 7, in accordance with one or more embodiments of the present disclosure.

Referring to FIGS. 7 and 8, in some embodiments of the fuel manifold adapter 64, the first mount portion 108 and the second mount portion 110 may be configured for sliding contact (e.g., axially sliding contact) between one another. The second mount portion 110 of FIGS. 7 and 8 includes a tubular body 160. The tubular body 160 extends circumferentially about (e.g., completely around) an axial centerline 162 of the second mount portion 110. The tubular body 160 forms an interior passage 164 extending along the axial centerline 162. The first mount portion 108 is positioned within the interior passage 164. The first mount portion 108 of FIGS. 7 and 8 includes a tubular body 166. The tubular body 166 is configured to be positioned within the interior passage 164 and to slidingly contact the tubular body 160 within the interior passage 164. The first mount portion 108 may include one or more O-rings 168, which O-rings 168 may contact the tubular body 160 as the tubular body 166 axially slides relative to the tubular body 160. The fuel manifold adapter 64 of FIGS. 7 and 8 may permit axial movement of the components of the fuel assembly 32 but may substantially restrict radial and tangential movement.

Figure 9:
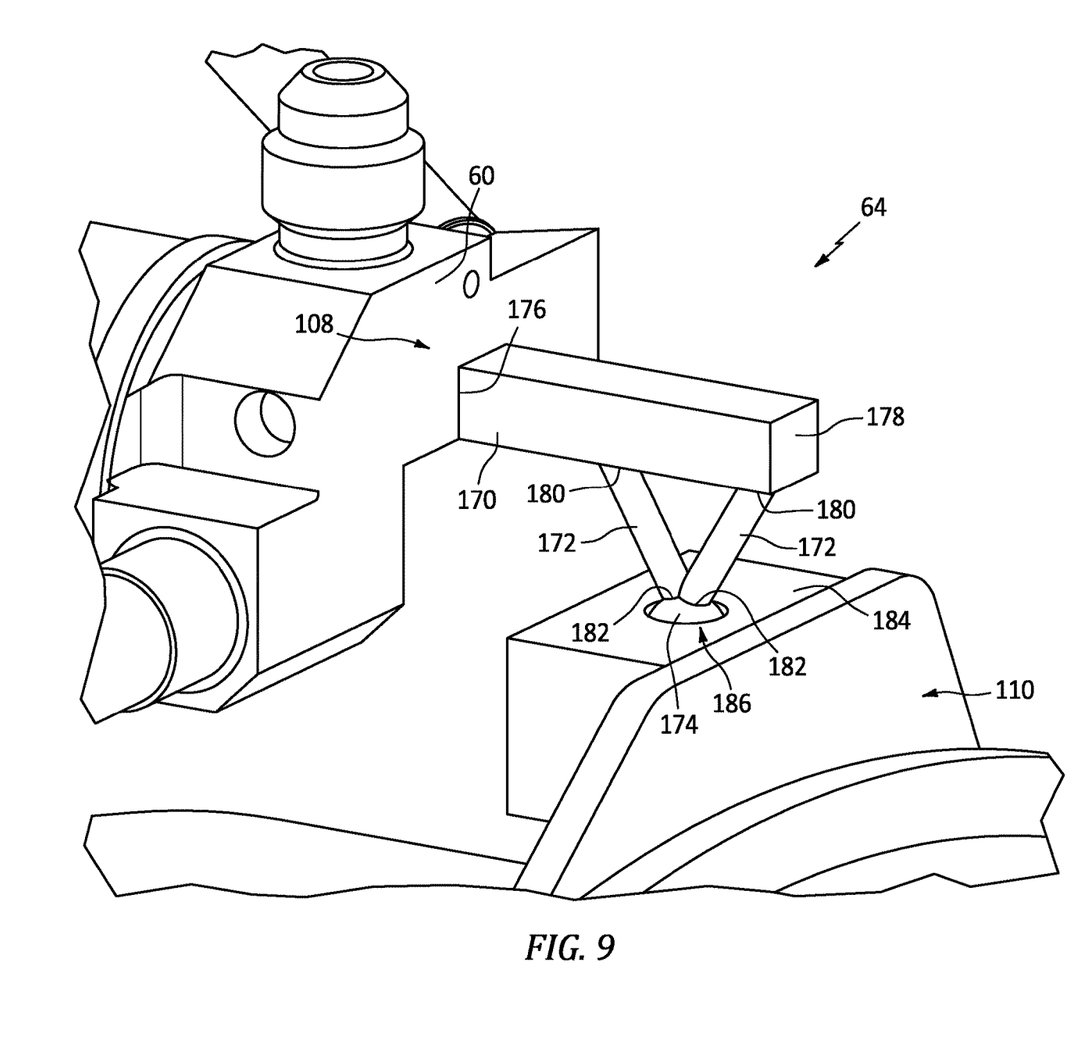
FIG. 9 illustrates a perspective view of another fuel manifold adapter, in accordance with one or more embodiments of the present disclosure.

Referring to FIG. 9, another embodiment of the fuel manifold adapter 64 is illustrated. The first mount portion 108 of FIG. 9 includes an axially-extending arm 170, one or more radially-extending arms 172, and a spherical bearing 174. The axially-extending arm 170 extends between and to a first end 176 of the axially-extending arm 170 and a second end 178 of the axially-extending arm 170. The first end 176 may be mounted to the fuel port 60. Alternatively, the axially-extending arm 170 may be formed by the fuel port 60. Each of the radially-extending arms 172 extend between and to a first end 180 of the respective radially-extending arm 172 and a second end 182 of the respective radially-extending arm 172. The first end 180 of each radially-extending arm 172 is mounted to the axially-extending arm 170. For example, the first end 180 may be mounted to the axially-extending arm 170 at (e.g., on, adjacent, or proximate) the second end 178. The second end 182 of each radially-extending arm 172 is mounted to the spherical bearing 174. The second end 182 of each radially-extending arm 172 is located radially inward of the first end 180 of each respective radially-extending arm 172. The second mount portion 110 includes a mount body 184. The mount body 184 forms a spherical socket 186. The spherical bearing 174 is retained within the spherical socket 186 and configured to rotate freely within the spherical socket 186. The fuel manifold adapter 64 of FIG. 9 may allow a limited amount of axial, radial, tangential movement for the components of the fuel assembly 32 (see FIGS. 2 and 3).

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A fuel assembly for a gas turbine engine, the fuel assembly comprising:
   a first case extending circumferentially about an axial centerline, the first case extending from a first axial end of the first case to a second axial end of the first case;
   a second case extending circumferentially about the axial centerline, the second case extending from a first axial end of the second case to a second axial end of the second case, the first axial end of the second case mounted to the second axial end of the first case;
   a flow divider valve mounted on and to the first case;
   a fuel supply tube connected to the flow divider valve;
   a fuel manifold adapter mounted to the second case, the fuel manifold adapter including a first mount portion and a second mount portion, the first mount portion is rotatably mounted to the second mount portion, the first mount portion connected to the fuel supply tube, the second mount portion connected to the second case, the first mount portion axially moveable relative to the second mount portion by rotation of the first mount portion relative to the second mount portion; and
   a fuel manifold extending circumferentially about the axial centerline, the fuel manifold is mounted on and to the second case, and the fuel manifold is connected to the first mount portion;
   wherein the fuel manifold is located axially between the fuel manifold adapter and the flow divider valve;
   wherein the first mount portion includes a first fastener;
   wherein the second mount portion includes a second fastener;
   wherein the fuel manifold adapter includes a link including a link body, the link body rotatably mounted to each of the first fastener and the second fastener; and
   wherein the link includes a first bearing and a second bearing, each of the first bearing and the second bearing mounted within the link body, the first bearing surrounding the first fastener, the second bearing surrounding the second fastener.

2. The fuel assembly of claim 1, wherein the second case includes a flange at the second axial end of the second case, the second mount portion mounted to the second case at the flange.

3. The fuel assembly of claim 1, wherein the fuel manifold is connected to the first mount portion by a fuel port, the fuel port fluidly coupled with the fuel supply tube.

4. The fuel assembly of claim 3, further comprising one or more fuel conduits fluidly coupling the fuel port to a fuel inlet of the fuel manifold, and a fuel sleeve, the fuel sleeve including a first end and a second end opposite the first end, the first end located at the fuel port, the second end located at the fuel inlet, the fuel sleeve surrounding the one or more fuel conduits from the first end to the second end.

5. The fuel assembly of claim 3, wherein the fuel port is located axially between the fuel manifold adapter and the fuel manifold.

6. The fuel assembly of claim 1, wherein one or both of the first bearing and the second bearing is configured as a spherical bearing.

7. A gas turbine engine having an axial centerline, the gas turbine engine comprising:
   a combustor;
   a bladed turbine rotor configured to rotate in response to a combustion gas flow from the combustor;
   a first case extending circumferentially about the axial centerline, the first case surrounding at least a portion of the combustor;
   a second case extending circumferentially about the axial centerline, the second case positioned axially adjacent the first case, the second case surrounding at least a portion of the bladed turbine rotor;
   a flow divider valve mounted on and to the first case;
   a fuel supply tube connected to the flow divider valve;
   a fuel manifold adapter mounted to the second case, the fuel manifold adapter including a first mount portion and a second mount portion, the first mount portion connected to the fuel supply tube, the second mount portion connected to the second case, the first mount portion moveable relative to the second mount portion; and
   a fuel manifold extending circumferentially about the axial centerline, the fuel manifold is mounted on and to the second case, and the fuel manifold is connected to the first mount portion;
   wherein the fuel manifold is located axially between the fuel manifold adapter and the flow divider valve;
   wherein the first mount portion includes a first fastener;
   wherein the second mount portion includes a second fastener;
   wherein the fuel manifold adapter includes a link including a link body, the link body rotatably mounted to each of the first fastener and the second fastener; and
   wherein the link includes a first bearing and a second bearing, each of the first bearing and the second bearing mounted within the link body, the first bearing surrounding the first fastener, the second bearing surrounding the second fastener.

8. The gas turbine engine of claim 7, wherein:
   the link extends along a link center axis; and
   the link center axis is offset from a radial direction by an offset angle in an axial direction toward the flow divider valve.

9. The gas turbine engine of claim 8, wherein the offset angle has a nominal value of greater than zero degrees (0°) and less than or equal to thirty-five degrees (35°).

* * * * *